United States Patent
Zhao et al.

(10) Patent No.: US 11,912,436 B1
(45) Date of Patent: Feb. 27, 2024

(54) FULLY AUTOMATED TOWING, ALIGNMENT AND HANGAR SYSTEM AND METHOD FOR OFFSHORE OPERATION HELICOPTER

(71) Applicant: Yanshan University, Qinhuangdao (CN)

(72) Inventors: Dingxuan Zhao, Qinhuangdao (CN); Lixin Wang, Qinhuangdao (CN); Zhuxin Zhang, Qinhuangdao (CN); Qian Liu, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 0 days.

(21) Appl. No.: 18/388,255

(22) Filed: Nov. 9, 2023

(30) Foreign Application Priority Data

Nov. 27, 2022 (CN) .......................... 202211497580.0

(51) Int. Cl.
| | |
|---|---|
| *B64F 1/12* | (2006.01) |
| *G05D 3/12* | (2006.01) |
| *G06T 7/60* | (2017.01) |
| *G06T 7/13* | (2017.01) |

(Continued)

(52) U.S. Cl.
CPC .............. *B64F 1/125* (2013.01); *B64F 1/222* (2013.01); *G05D 3/12* (2013.01); *G06T 7/13* (2017.01); *G06T 7/246* (2017.01); *G06T 7/60* (2013.01); *G06T 7/73* (2017.01); *G06T 2207/10032* (2013.01); *G06T 2207/30241* (2013.01)

(58) Field of Classification Search
CPC . B64F 1/125; B64F 1/222; G05D 3/12; G06T 7/13; G06T 7/246; G06T 7/60; G06T 7/73; G06T 2207/10032; G06T 2207/30241
See application file for complete search history.

(56) References Cited

U.S. PATENT DOCUMENTS

2022/0306157 A1* 9/2022 Sun .................... B60W 60/0015

* cited by examiner

Primary Examiner — Valentina Xavier
(74) Attorney, Agent, or Firm — IPRO, PLLC

(57) ABSTRACT

A fully automated towing, alignment and hangar system suitable for an offshore operation helicopter includes a quick mooring device, a wide-angle camera installed on a rear wall of the quick mooring device, a longitudinal towing device, a DSP control unit, an MCU control unit, a helicopter and a mooring bar thereof. An alignment method based on above system includes following steps of acquiring an attitude image of a steering wheel, calculating a helicopter yaw angle and a steering wheel deflection angle, calculating position coordinates of the steering wheel, a first wheel and a second wheel in a deck coordinate system, judging boundaries relative to a towing indication line, extracting an optimal path suitable for the movement of the helicopter, calculating lateral and longitudinal movement position control commands, driving the movement of the helicopter, and repeating the above operations until the automated towing, alignment and hangar are completed. The method provided by the present disclosure does not need human intervention in the whole process, and thereby reducing operation difficulty, improving transshipment efficiency, and ensuring the safety of auxiliary personnel and equipment on the ship, and having an important practical value in the fields of ships, military industry and the like.

7 Claims, 5 Drawing Sheets

(51) Int. Cl.
*G06T 7/246* (2017.01)
*G06T 7/73* (2017.01)

FULLY AUTOMATED TOWING, ALIGNMENT AND HANGAR SYSTEM AND METHOD FOR OFFSHORE OPERATION HELICOPTER

TECHNICAL FIELD

The present disclosure relates to the technical field of comprehensive safety guarantee for an offshore operation helicopter, in particular to a fully automated towing, alignment and hangar system and method for an offshore operation helicopter.

BACKGROUND

Generally, an offshore operation helicopter carries out tasks in harsh sea conditions, and helicopter recovery and launch technologies provide safety assurance for helicopter takeoff and landing. It is of great significance to safely and quickly transfer the helicopter to a hangar after completing a mission, in order to further improve availability and safety of the helicopter. At present, the conventional safety systems of the helicopter include a Harpoon-Grid Device, E System, RAST System, ASIST System, and a safe and rapid recovery and launch system for an offshore operation helicopter as proposed by the China Shipbuilding Industry System Engineering Research Institute. However, the above systems cannot achieve fully automated towing and alignment for hangar storage, but usually rely on manual or tow vehicle-guided manual towing methods, requiring several shipboard personnel to cooperate during the implementation and influenced by skills and experiences of operators, so that it is unreliable to ensure a fast, efficient, and safe towing of the helicopter from a landing site to the hangar. To address this problem, there is a need to develop a fully automated towing, alignment and hangar system and method for an offshore operation helicopter, to effectively enhance operational efficiency during the helicopter transfer process and ensure the safety of shipboard personnel and equipment.

SUMMARY

The present disclosure aims to overcome limitations of the existing towing and alignment technologies of the helicopter by introducing a fully automated towing, alignment and hangar system and method for an offshore operation helicopter. This method is particularly suitable for more challenging operations involving a curved track helicopter transfer system, to effectively address the problems of high difficulty and low safety associated with manual towing operations, and thus to enhance the efficiency of helicopter transfer operations and ensure the safety of the shipboard personnel and equipment. It holds important practical value in sectors such as shipping and defense industries.

The present disclosure adopts a novel technical solution, consisting of a system and implementation steps. The specific solutions are as follows:

A fully automated towing, alignment and hangar system suitable for the offshore operation helicopter includes a quick mooring device for a lateral alignment for a movement of the helicopter, a wide-angle camera for acquiring attitudes of steering wheel and installed on a rear wall of the quick mooring device, a longitudinal towing device for longitudinally towing the movement of the helicopter, a control system consisting of a DSP control unit and a MCU control unit, a helicopter, and a helicopter mooring bar.

A fully automated towing, alignment and hangar method suitable for an offshore operation helicopter includes following steps of acquiring an attitude image of a steering wheel by a wide-angle camera, calculating a helicopter yaw angle and a steering wheel deflection angle, calculating position coordinates of the steering wheel, a first wheel and a second wheel in a deck coordinate system, judging boundaries of the steering wheel, the first wheel and the second wheel relative to a towing indication line, and extracting an optimal movement path suitable for the movement of the helicopter, calculating lateral and longitudinal movement position control commands, driving a lateral movement of the helicopter by the quick mooring device, driving a longitudinal movement of the helicopter by a towing power device, and repeating the above operations until the automated towing, alignment and hangar of the helicopter is completed. The method of the present disclosure has no need human intervention in the whole process and has advantages of high safety and intelligence.

The fully automated towing, alignment and hangar system suitable for the offshore operation helicopter has following characteristics:

the quick mooring device is equipped with a mechanical claw that is connected to the helicopter mooring bar installed on a belly of the helicopter via a cylindrical joint, during a process that the quick mooring device laterally aligns the movement of the helicopter, the mechanical claw remains perpendicular to the towing track and follows the movement of the helicopter;

the wide-angle camera is installed at a central position of the rear wall of the quick mooring device and moves along with the quick mooring device, during a process that the quick mooring device and the longitudinal towing device tow the movement of the helicopter, the wide-angel camera always captures the attitudes of the steering wheel;

during the process that the longitudinal towing device tows the movement of the helicopter, the quick mooring device always moves along with the movement of the helicopter along the towing track, and the longitudinal towing device comprises an encoder for recording a position of the quick mooring device on the track, and the towing track is divided into five segments including a first segment of the towing track, a second segment of the towing track, a third segment of the towing track, a fourth segment of the towing track and a fifth segment of the towing track;

the control system comprises a DSP control unit and an MCU control unit, wherein the DSP control unit is configured to process attitude images of the steering wheel, creates a helicopter coordinate system and a deck coordinate system, calculates a wheel position coordinate, judges a boundary of a towing indication line, stores and extracts a movement path of the helicopter; and the MCU control unit is configured to generate horizontal and vertical position control commands;

the helicopter comprises a steering wheel, a first wheel and a second wheel, wherein the steering wheel is installed at a tail of the helicopter and is a universal wheel with large eccentricity.

The fully automated towing, alignment and hangar method suitable for an offshore operation helicopter includes following steps:

S1. acquiring an attitude image of a steering wheel of a helicopter, wherein as a helicopter transfer system enters an automatic control mode, the attitude image of the current steering wheel of the helicopter is acquired by a wide-angle camera;

S2. calculating a helicopter yaw angle and a steering wheel deflection angle, wherein a DSP control unit processes the acquired attitude image of the steering wheel of the helicopter, extracts characteristic information, and calculates the helicopter yaw angle and the steering wheel deflection angle of the helicopter; the characteristic information includes a contour pixel matrix of a circle, a tire and a rotating shaft of the helicopter steering wheel, and the steering wheel deflection angle are directly obtained through characteristics of the contour pixel matrix;

S3. calculating a position coordinate of the steering wheel of the helicopter, a first wheel and a second wheel in a deck coordinate system, wherein a helicopter coordinate system and the deck coordinate system are created, and the position coordinate of the steering wheel of the helicopter, the first wheel and the second wheel in the deck coordinate system are calculated through a coordinate transformation relationship and the helicopter yaw angle;

S31. creating the helicopter coordinate system, wherein the position coordinate of the steering wheel of the helicopter, the first wheel and the second wheel in the helicopter coordinate system are calculated according to size parameters of the helicopter and the helicopter yaw angle; the helicopter coordinate system takes a helicopter mooring bar as an origin, and when the helicopter yaw angle is 0°, a central axis of the helicopter is a $y_0$ axis, a direction pointing to a bow is a positive direction of the $y_0$ axis, a ray perpendicular to the $y_0$ axis is an $x_0$ axis, and a direction pointing to a starboard side of a ship is a positive direction of the $x_0$ axis;

S32. creating a deck coordinate system, wherein the deck coordinate system takes a starting point of a deck towing track of the ship as a coordinate origin, a central axis of a starting part of the towing track as ay axis, a direction pointing to a bow of a ship as a positive direction of they axis, a ray perpendicular to they axis as an x axis, and a direction pointing to a starboard side of the ship as a positive direction of the x axis, and a mathematical equation of the towing track and a trajectory equation of a towing indication line are created under the deck coordinate system;

S33. obtaining the position coordinate of the steering wheel of the helicopter, the first wheel and the second wheel in the deck coordinate system by calculating the coordinate transformation relationship from the helicopter coordinate system to the deck coordinate system;

S4. judging boundaries of the steering wheel, the first wheel and the second wheel relative to the towing indication line, wherein the position boundaries of the steering wheel, the first wheel and the second wheel in the deck coordinate system are judged relative to the mathematical equation of the towing track and the trajectory equation of the towing indication line; corresponding relationship between the position coordinates of the steering wheel, the first wheel and the second wheel and the trajectory equation of the towing indication line is obtained by calculating a distance from a point to a line, and the corresponding relationship includes three scenarios, that is, inside, above and outside the towing indication line;

S5. extracting an optimal movement path suitable for the helicopter, wherein the optimal movement path suitable for the helicopter at a current attitude is extracted from a knowledge base according to boundary judgment results of the steering wheel, the first wheel and the second wheel and the steering wheel deflection angle; and the knowledge base consists of a large number of manual operation practices, and is compiled into an execution statement of the DSP control unit through C language;

S6. calculating lateral and longitudinal movement position control commands according to the extracted optimal movement path suitable for the helicopter and driving the movement of the helicopter, wherein after selecting the optimal movement path within a control period, the MCU control unit sends a lateral alignment position control command to a hydraulic drive system of a quick mooring device and a longitudinal towing position control command to a hydraulic drive system of a longitudinal towing device, and the quick mooring device and the longitudinal towing device drive the movement of the helicopter;

S7. repeating steps S1 to S6 until the automated towing, alignment and hangar of the helicopter is completed, wherein during an actual movement of the helicopter, the optimal movement path is compensated and adjusted according to a latest attitude of the helicopter within the control period, so as to ensure that the helicopter moves towards a hangar according to the extracted optimal movement path.

Further, the step S2 specifically includes following steps:

S21. calculating the deflection angle θ of a body of the helicopter relative to a central axis of the wide-angle camera based on a position of the contour pixel matrix of the steering wheel in a whole image;

S22. acquiring a vertical offset distance h of the helicopter steering wheel in a longitudinal direction based on the contour pixel matrix of the steering wheel;

$$h = L_4\left(1 - \frac{m_2 \times n_2}{m_1 \times n_1}L_4\right) \quad (1)$$

Wherein $L_4$ represents a vertical distance between a rear wall of the quick mooring device and a central axis of the steering wheel when the helicopter yaw angle is 0°; $m_1$, $n_1$ respectively represent horizontal and vertical pixel numbers of the contour pixel matrix occupied by the steering wheel in an attitude image when the helicopter yaw angle is 0°; $m_2$, $n_2$ respectively represent the horizontal and vertical pixel numbers of the contour pixel matrix occupied by the steering wheel in the attitude image when the helicopter is in a yaw state;

S23. calculating the helicopter yaw angle φ:

$$\varphi = \arcsin\left(\frac{\tan\theta(L_4 - h) - x_1}{L_3}\right) \quad (2)$$

wherein $x_1$ represents a position indicating deviation of an origin of the helicopter coordinate system relative to a center of the quick mooring device, which is obtained by a position signal of a mechanical claw of the quick mooring device; and $L_3$ represents a vertical distance between the central axis of the steering wheel and the helicopter mooring bar.

Optionally, in the step S31, the position coordinates of the steering wheel in the helicopter coordinate system are as follows:

$$\begin{cases} x_A = (L_4 + L_5)\sin\varphi \\ y_A = (L_4 + L_5)(1 - \cos\varphi) \end{cases} \quad (3)$$

wherein $x_A$, $y_A$ respectively represent an $x_0$ direction coordinate and a $y_0$ direction coordinate of the steering wheel in the helicopter coordinate system; and $L_5$ represents a distance between the rear wall of the quick mooring device and the center of the helicopter mooring bar;

a position coordinate of the first wheel in the helicopter coordinate system is as follows:

$$\begin{cases} x_B = L_2\sin\varphi + \dfrac{W}{2} \\ y_B = L_2\cos\varphi \end{cases} \quad (4)$$

wherein $x_B$, $y_B$ respectively represent an $x_0$ direction coordinate and a $y_0$ direction coordinate of the first wheel in the helicopter coordinate system; $L_2$ represents a vertical distance from the helicopter mooring bar to a wheel shaft of the helicopter steering wheel, which is a central axis of the first wheel and the second wheel; W represents a wheel pitch of the first wheel and the second wheel;

a position coordinates of the second wheel in the helicopter coordinate system is as follows:

$$\begin{cases} x_C = L_2\sin\varphi - \dfrac{W}{2} \\ y_C = L_2(1 + \cos\varphi) \end{cases} \quad (5)$$

wherein $x_C$, $y_C$ representatively represent an $x_0$ direction coordinate and a $y_0$ direction coordinate of the second wheel in the helicopter coordinate system.

Optionally, the step S33 specifically comprises following steps:

S331. calculating the coordinate transformation relationship from the helicopter coordinate system to the deck coordinate system, wherein the coordinates of the origin of the helicopter coordinate system in the deck coordinate system are first calculated, that is, the coordinates $(x_G, y_G)$ of the helicopter mooring bar in the deck coordinate system are as follows:

$$\begin{cases} x_G = x_1 \\ y_G = y_1 \end{cases} \quad (y_1 < Y_4 + l) \quad (6)$$

$$\begin{cases} x_G = -\left[\left(\dfrac{\alpha}{l}\tan\dfrac{\alpha}{2} + y_1 - Y_4 - l\right)\times\sin\alpha - \dfrac{x_1}{\cos\alpha}\right] \\ y_G = \left(\dfrac{\alpha}{l}\tan\dfrac{\alpha}{2} + y_1 - Y_4 - l\right)\times\sin\alpha + Y_4 + \dfrac{\alpha}{l}\tan\dfrac{\alpha}{2} \end{cases} \quad (Y_4 + l \leq y_1 < Y_4 + l + Y)$$

$$\begin{cases} x_G = -X_2 \\ y_G = (y_1 - 2l - Y) + Y_5 + Y_6 + Y_7 \end{cases} \quad (Y_4 + l + Y \leq y_1 < Y_4 + 2l + Y + Y_8)$$

wherein $y_1$ represents a movement position of the quick mooring device along the towing track, obtained by an encoder installed on a towing power device; $Y_4, Y_5, Y_6, Y_7, Y_8$ respectively represent lengths of a first segment of the towing track, a second segment of the towing track, a third segment of the towing track, a fourth segment of the towing track and a fifth segment of the towing track in a y direction; Y represents a length of the third segment of the towing track; l represents an arc length of the second segment of the towing track and the fourth segment of the towing track; $X_2$ represents an x direction coordinate of a circle center $O_2$ corresponding to an arc of the fourth segment of the towing track; α represents a circle center angle corresponding to the arcs of the second segment of the towing track and the fourth segment of the towing track;

S332. calculating position coordinates $(x'_A, y'_A)$ of the steering wheel in the deck coordinate system, a position coordinate $(x'_B, y'_B)$ of the first wheel in the deck coordinate system and a position coordinate $(x'_C, y'_C)$ of the second wheel in the deck coordinate system, which are respectively presented as follows:

$$\begin{cases} x'_A = (L_5 + L_4)\sin\varphi - x_G \\ y'_A = (L_5 + L_4)(1 - \cos\varphi) - y_G \end{cases} \quad (7)$$

$$\begin{cases} x'_B = L_2\sin\varphi + \dfrac{W}{2} - x_G \\ y'_B = L_2\cos\varphi + y_G \end{cases}$$

$$\begin{cases} x'_C = L_2\sin\varphi - \dfrac{W}{2} - x_G \\ y'_C = L_2(1 + \cos\varphi) + y_G \end{cases}.$$

Optionally, in the step S32, the towing indication line comprises a left towing indication line and a right towing indication line, a symmetrical median line of the left towing indication line and the right towing indication line refers to the towing track, and a mathematical equation of the towing track is as follows:

$$\begin{cases} x = 0 & (0 \le y \le Y_4) \\ \left(\dfrac{Y_5}{\sin\alpha}\right)^2 = \left(x + \dfrac{Y_5}{\sin\alpha}\right)^2 + (y - Y_4)^2 & (Y_4 < y \le Y_4 + Y_5) \\ y = -\cot\alpha x + \left(Y_4 + Y_5 + Y_5\cot^2\alpha - \dfrac{l\cot\alpha}{\alpha}\right) & (Y_4 + Y_5 < y \le Y_4 + Y_5 + Y_6) \\ \left(\dfrac{Y_7}{\sin\alpha}\right)^2 = (x - X_2)^2 + (y - Y_4 - Y_5 - Y_6 - Y_7)^2 & (Y_4 + Y_5 + Y_6 < y \le Y_4 + Y_5 + Y_6 + Y_7) \\ x = -X_3 & (Y_4 + Y_5 + Y_6 + Y_7 < y \le Y_4 + Y_5 + Y_6 + Y_7 + Y_8) \end{cases} \quad (8)$$

where $X_3$ represents a distance between they axis and the fifth segment of the towing track;

the trajectory equation of the left towing indication line is as follows:

$$\begin{cases} x = -X_1 & (0 \le y \le Y_1) \\ y = -\cot\alpha x + (Y_1 - \cot\alpha X_1) & (Y_1 < y < Y_1 + Y_2) \\ x = -\dfrac{Y_2}{\cot\alpha} - X_1 & (Y_1 + Y_2 \le y \le Y_1 + Y_2 + Y_3) \end{cases} \quad (9)$$

Wherein $X_1$ represents a distance between the left towing indication line and the towing track; $Y_1, Y_2, Y_3$ respectively represent the lengths of a first segment of the left towing indication line, a second segment of the left towing indication line and a third segment of the left towing indication line in they direction;

the trajectory equation of the right towing indication line is as follows:

$$\begin{cases} x = X_1 & (0 \le y \le Y_1) \\ y = -\cot\alpha x + (Y_1 - \cot\alpha X_1) & (Y_1 < y < Y_1 + Y_2) \\ x = X_1 - \dfrac{Y_2}{\cot\alpha} & (Y_1 + Y_2 \le y \le Y_1 + Y_2 + Y_3) \end{cases} \quad (10)$$

Optionally, when the helicopter yaw angle fuselage is 0°, the wide-angle camera coincides with an axis of the body of the helicopter, and the wide-angle camera acquires an image state of the steering wheel within ±37.5° with the towing track as a center line.

Compared to existing technologies, the technical advancements of the present disclosure are as follows:

1. The present disclosure provides a fully automated towing, alignment and hangar system and method suitable for an offshore operation helicopter, in which a wide-angle camera for capturing an image of a steering wheel of the helicopter only installed on a quick mooring device is provided and has a high level of compatibility with existing systems, based on the rapid recovery system of the existing helicopter.

2. A novel and original method for fully automated towing, alignment and hangar method suitable for the helicopter on a curved towing track is proposed. The method includes following steps: calculating of the helicopter yaw angle and the steering wheel deviation angle based on the image of the steering wheel of the helicopter; creating a coordinate system for the helicopter and a deck, and calculating the positions of the helicopter's wheels in a deck coordinate system through coordinate transformation; performing a boundary judgment based on an equation of a towing guidance line, and extracting an optimal path suitable for a current attitude and motion of the helicopter from an operational experience knowledge base; performing real-time compensation control to a towing and alignment process within an adjustable control step length, and continuously repeating the above mentioned steps to achieve a purpose of the automated towing, alignment and hangar of the helicopter.

3. The present disclosure proposes a fully automated towing, alignment and hangar system and method for the offshore operation helicopter, which does not require human intervention during the implementation process, and thereby greatly reducing the operational difficulties of the transportation of current offshore operation helicopter. Meanwhile, the proposed method can effectively improve the operational efficiency during that transportation of the helicopter and can greatly ensure the safety of deck personnel and equipment.

BRIEF DESCRIPTION OF THE DRAWINGS

By referring to the accompanying figures and reading the detailed description of non-limiting embodiments, additional features, objectives, and advantages of the present disclosure will become more apparent.

Figure 1:
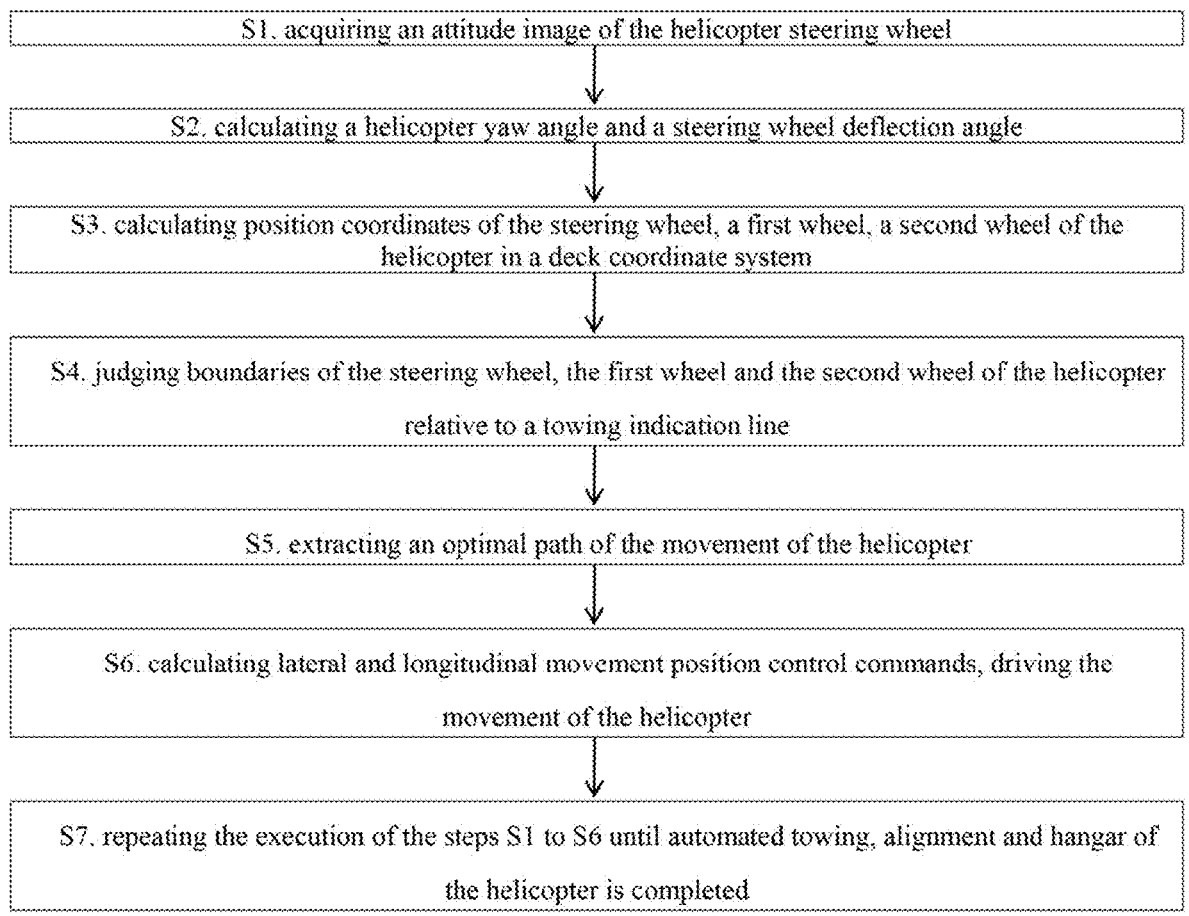
FIG. 1 is a flowchart of implementing a fully automated towing, alignment and hangar method for an offshore operation helicopter according to the present disclosure.

In the drawings, 2.1—helicopter steering wheel neutral position; 2.2—central axis between a rotating shaft of the helicopter steering wheel and a wide-angle camera; 2.3—helicopter steering wheel deflected position; 2.4—overall image captured by the wide-angle camera; 2.5—pixel matrix of an image for the helicopter steering wheel neutral position; 2.6—pixel matrix of a position image of the steering wheel when the helicopter is in a deflected position; 3.1—helicopter steering wheek3.2 central axis of the helicopter; 3.3—wide-angle camera; 3.4—quick mooring device; 3.5—helicopter mooring bar; 3.6—mechanical claw; 3.7—first wheel; 3.8—second wheel; 3.9—helicopter; 4.1—deck coordinate system; 4.2—left towing indication line; 4.3—right towing indication line; 4.4—first segment of a towing track; 4.5—second segment of a towing track; 4.6 third segment of a towing track; 4.7—fourth segment of a towing track; 4.8—fifth segment of a towing track;

4.9—towing track; 4.10—bow direction; 4.11—longitudinal towing device; 4.12—encoder; 5.1—DSP control unit;

5.2—MCU control unit; 6.1—trajectory of the helicopter mooring bar during an automated towing and alignment process.

DETAILED DESCRIPTION

Detailed explanation of the present disclosure will be provided in conjunction with the accompanying figures and embodiments. It should be understood that the specific embodiments described here are only intended to illustrate the associated disclosure but not be interpreted as being limited to the present disclosure. In addition, it should be noted that, for the sake of clarity, the portions relating to the associated disclosure are merely shown in the drawings.

It should be noted that the embodiments and the features of the embodiments in the present disclosure can be combined with each other without conflict. The present disclosure will be described in detail with reference to the drawings and embodiments.

Figure 3:
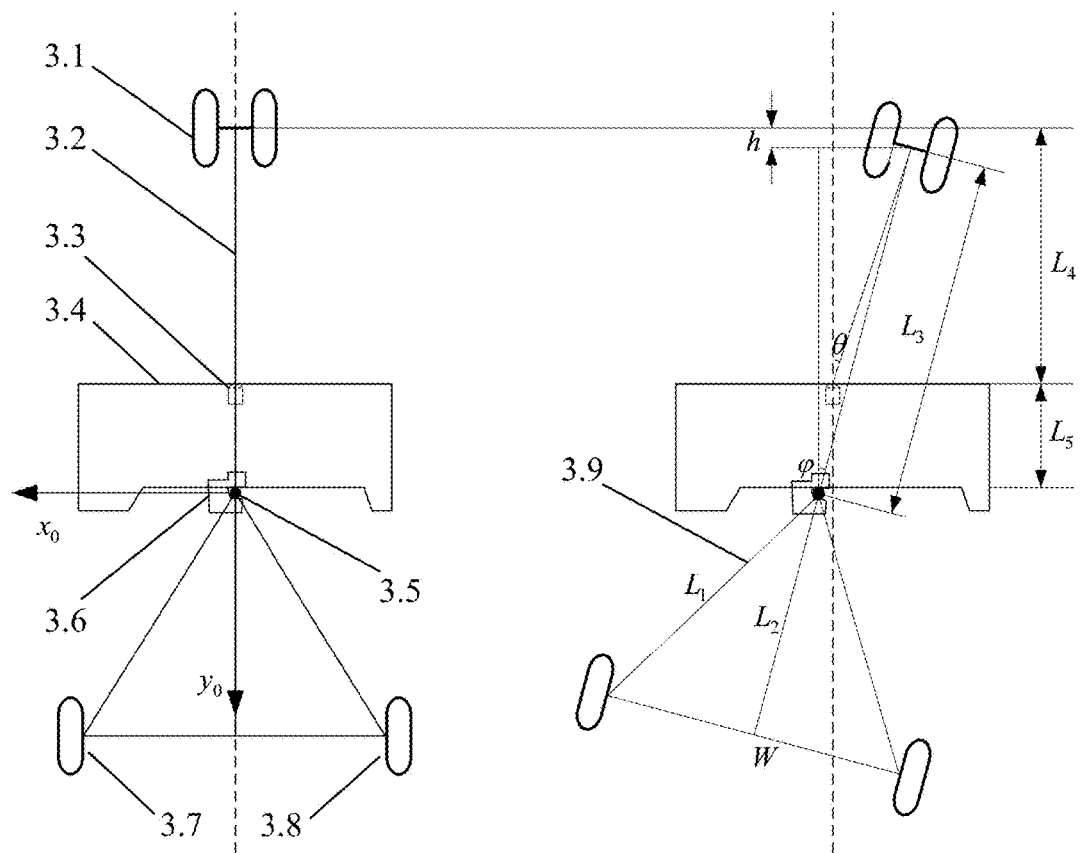
FIG. 3 is a schematic view of a helicopter coordinate system according to the present disclosure.
Figure 4:
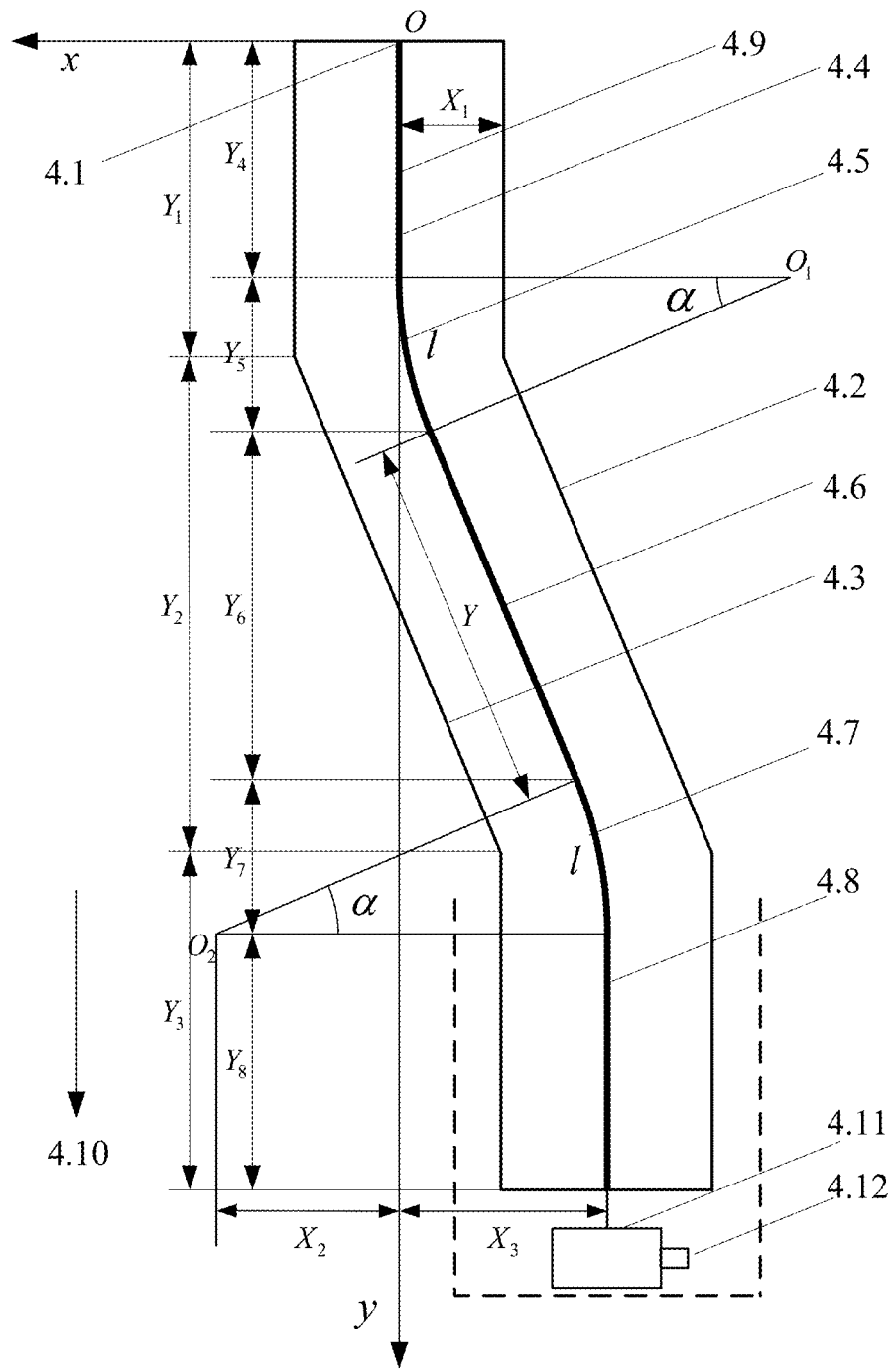
FIG. 4 is a schematic view of a deck coordinate system according to the present disclosure.
Figure 5:
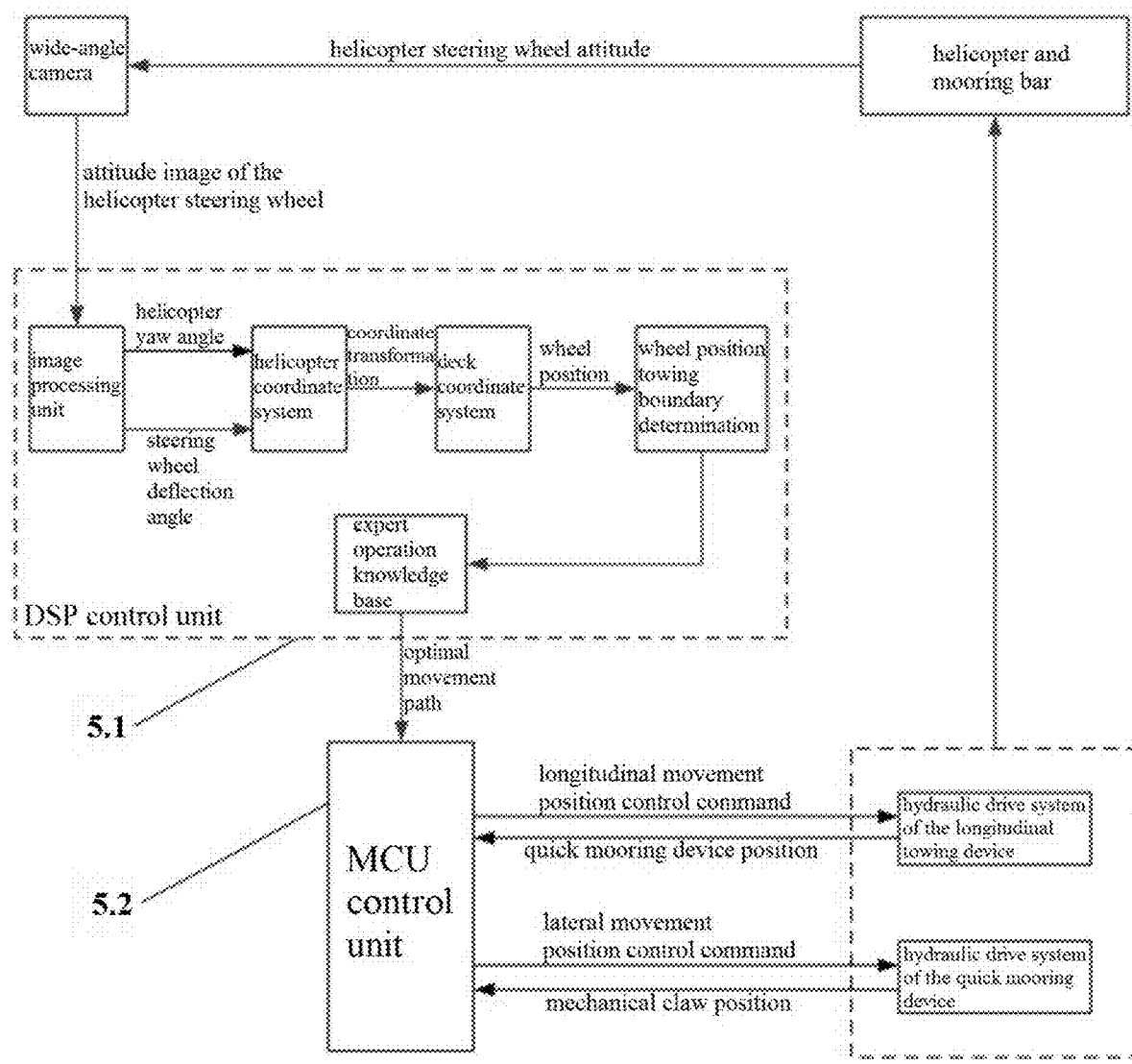
FIG. 5 is a schematic view of composition and working process of the fully automated towing, alignment and hangar system for the offshore operation helicopter according to the present disclosure.

As shown in FIGS. 3, 4 and 5, a fully automated towing, alignment and hangar system suitable for an offshore operation helicopter includes a quick mooring device 3.4 for lateral correction of movement of a helicopter 3.9, a wide-angle camera 3.3 for acquiring attitudes of helicopter steering wheel 3.1, a longitudinal towing device 4.11 for longitudinally towing the movement of the helicopter 3.9, a control system consisting of a DSP control unit 5.1 and an MCU control unit 5.2, a helicopter 3.9 and a helicopter mooring bar 3.5.

The fully automated towing, alignment and hangar system and method for the offshore operation helicopter have following characteristics:

The quick mooring device 3.4 is equipped with a mechanical claw 3.6 that forms a cylindrical joint connection with the helicopter mooring bar 3.5 installed on a belly of the helicopter 3.9. During the process that the movement of the helicopter 3.9 is laterally corrected by the quick mooring device 3.4, the mechanical claw 3.6 remains perpendicular to the towing track 4.9 and follows the movement of the helicopter 3.9.

The wide-angle camera 3.3 is installed in a central position of a rear wall of the quick mooring device 3.4 and follows the movement of the quick mooring device 3.4. During the process that the quick mooring device 3.4 and the longitudinal towing device 4.11 tow the helicopter 3.9, the wide-angle camera 3.3 is able to continuously capture real-time images of the attitudes of the helicopter steering wheel 3.1.

During the process that the movement of the helicopter 3.9 is towed by the longitudinal towing device 4.11, the quick mooring device 3.4 always follows the movement of the helicopter 3.9 along the towing track 4.9. The longitudinal towing device 4.11 includes an encoder 4.12 that records a position of the quick mooring device 3.4 on the track. The towing track 4.9 is divided into five segments, including a first segment of the towing track 4.4, a second segment of the towing track 4.5, a third segment of the towing track 4.6, a fourth segment of the towing track 4.7, and a fifth segment of the towing track 4.8.

The control system consists of two parts: a DSP control unit 5.1 for processing attitude images of the helicopter steering wheel 3.1, establishing the helicopter coordinate system 3.9 and the deck coordinate system 4.1, calculating position coordinates of the wheels, performing boundary judgments for a towing indication line, and storing and extracting movement path of the helicopter 3.9, and a MCU control unit 5.2. for generating lateral and longitudinal position control commands.

The helicopter 3.9 includes three wheels, that is, a steering wheel 3.1, a first wheel 3.7 and a second wheel 3.8, and the steering wheel 3.1 is installed at a tail of the helicopter 3.9 and is a universal wheel with a large eccentricity.

FIG. 1 is a flowchart of implementing a fully automated towing, alignment and hangar method for an offshore operation helicopter according to the present disclosure, which specifically includes following steps:

S1. acquiring an attitude image of the helicopter steering wheel 3.1: when the helicopter 3.9 transport system enters an automatic control mode, the current attitude image of the helicopter steering wheel 3.1 is captured by using the wide-angle camera 3.3. When the helicopter 3.9 has a yaw angle of 0°, the wide-angle camera 3.3 is aligned with the helicopter central axis 3.2. The wide-angle camera 3.3 captures the attitude images of the helicopter steering wheel 3.1 within the range of ±37.5° a centered line on the traction track 4.9.

Figure 2:
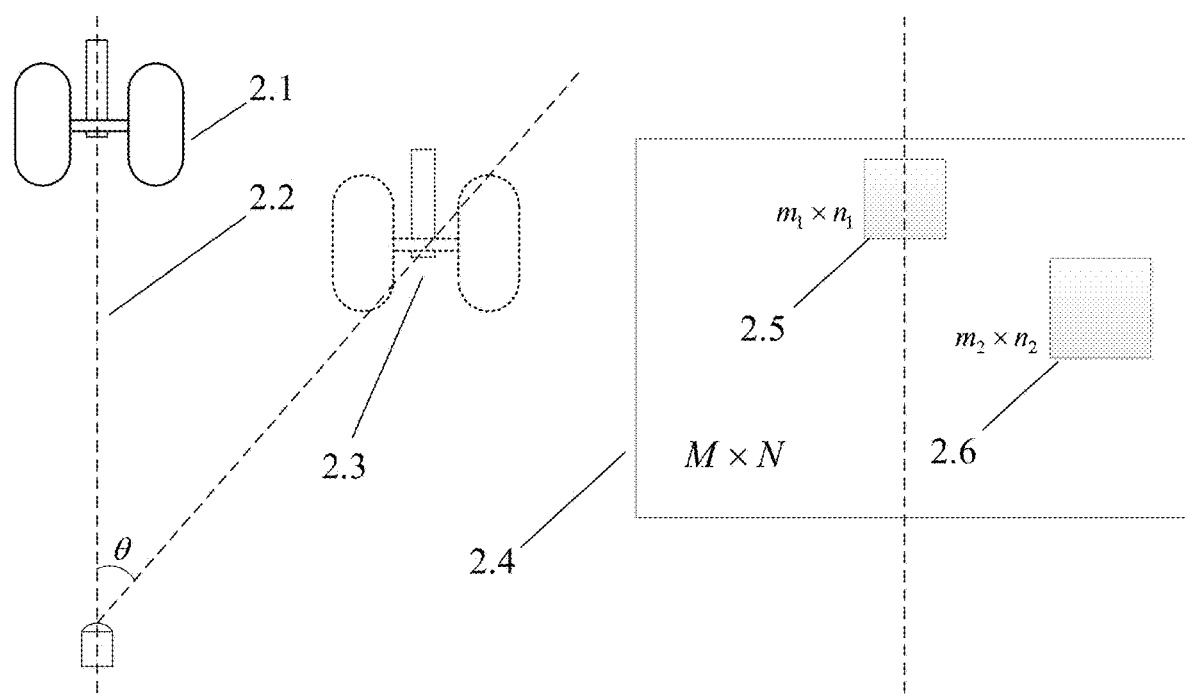
FIG. 2 illustrates a recognition principle of an image of a steering wheel of the helicopter according to the present disclosure.

S2. As shown in FIG. 2, calculating a yaw angle and a deflection angle of the steering wheel of the helicopter 3.9: the DSP control unit 5.1 processes the captured attitude image of the helicopter steering wheel 3.1, extracts feature information, and calculates the yaw angle and the deflection angle of the helicopter steering wheel 3.1 of the helicopter 3.9. The feature information includes contour pixel matrices of the steering wheel 3.1, a tire, and a rotating shaft. The deflection angle of the helicopter steering wheel 3.1 is obtained directly from the feature of the contour pixel matrix.

S21. As shown in FIG. 2, in an overall image 2.4 of the helicopter steering wheel captured by the wide-angle camera 3.3, a pixel matrix corresponding to a helicopter steering wheel neutral position 2.1 is 2.5, and a pixel matrix corresponding to a steering wheel deflected position 2.3 is 2.6. As such, it is possible to calculate a deflection angle θ of a body of the helicopter 3.9 relative to a central axis 2.2 between a rotating shaft of the helicopter steering wheel and a wide-angle camera.

S22. the contour pixel matrix of the overall attitude image 2.4 of the helicopter steering wheel 3.1 acquired by the wide-angle camera 3.3 is MxN, and a vertical offset distance h of the helicopter steering wheel 3.1 in a longitudinal direction can be obtained based on the contour pixel matrices 2.5 and 2.6 of the helicopter steering wheel 3.1;

$$h = L_4\left(1 - \frac{m_2 \times n_2}{m_1 \times n_1}L_4\right) \quad (1)$$

Where, $L_4$ represents a vertical distance between the rear wall of the quick mooring device 3.4 and the rotating shaft of the helicopter steering wheel 3.1 when the helicopter yaw angle is 0°. $m_1$, $n_1$ respectively represent numbers of pixel points in horizontal and longitudinal directions occupied by the contour pixel matrix of the helicopter steering wheel 3.1 in the overall attitude image 2.4 when the helicopter yaw angle is 0°. $m_2$, $n_2$ respectively represent numbers of pixel points in the horizontal and vertical directions occupied by the contour pixel matrix of the helicopter steering wheel 3.1 in the overall attitude image 2.4 when the helicopter is in a yaw state.

S23, calculating a yaw angle φ of the helicopter:

$$\varphi = \arcsin\left(\frac{\tan\theta(L_4 - h) - x_1}{L_3}\right) \quad (2)$$

Where $x_1$ represents a position of an origin of the helicopter coordinate system offset relative to a center of the quick mooring device 3.4, obtained from a position signal of the mechanical claw 3.6 of the quick mooring device 3.4; $L_3$ represents a vertical distance between a central axis of the helicopter steering wheel 3.1 and the helicopter mooring bar 3.5.

S3. calculating position coordinates of the steering wheel 3.1, the first wheel 3.7, and the second wheel 3.8 of the helicopter in the deck coordinate system 4.1; creating a coordinate system for the helicopter 3.9 and a deck coordinate system 4.1; calculating the position coordinates of the steering wheel 3.1, the first wheel 3.7, and the second wheel 3.8 of the helicopter in the deck coordinate system 4.1 by coordinate transformation relationships and the helicopter yaw angle 3.9.

S31. As shown in FIG. 3, creating a coordinate system for the helicopter 3.9; and calculating the position coordinates of the steering wheel 3.1, the first wheel 3.7, and the second wheel 3.8 of the helicopter in the coordinate system of the helicopter 3.9 based on size parameters of the helicopter 3.9 and the helicopter yaw angle 3.9. The coordinate system of the helicopter 3.9 is defined with the mooring bar 3.5 as an origin. When the helicopter yaw angle is 0°, taking the center axis 3.2 of the helicopter as a $y_0$ axis, a direction 4.10 pointing towards a bow is a $y_0$ axis positive direction; taking axis perpendicular to a $y_0$ axis as an $x_0$ axis, a direction pointing towards a starboard side of a ship is an $x_0$ axis positive direction.

The position coordinate of the helicopter steering wheel 3.1 in the helicopter coordinate system is as follows:

$$\begin{cases} x_A = (L_4 + L_5)\sin\varphi \\ y_A = (L_4 + L_5)(1 - \cos\varphi) \end{cases} \quad (3)$$

Wherein $x_A$, $y_A$ respectively represent the $x_0$ direction coordinate and the $y_0$ direction coordinate of the helicopter steering wheel 3.1 in the helicopter coordinate system; $L_5$ represents a central distance between the rear wall of the quick mooring device 3.4 and the helicopter mooring bar 3.5.

The position coordinate of the first wheel 3.7 in the helicopter coordinate system is as follows:

$$\begin{cases} x_B = L_2\sin\varphi + \dfrac{W}{2} \\ y_B = L_2\cos\varphi \end{cases} \quad (4)$$

Where $x_B$, $y_B$ represent an $x_0$ direction coordinate and a $y_0$ direction coordinate of the first wheel 3.7 in the helicopter coordinate system; $L_2$ represents a vertical distance from the helicopter mooring bar 3.5 to a wheel shaft of the helicopter steering wheel 3.1, where the wheel shaft of the helicopter steering wheel 3.1 is a center axis between the first wheel 3.7 and the second wheel 3.8; W represents a wheelbase between the first wheel 3.7 and the second wheel 3.8.

The position coordinate of the second wheel 3.8 in the helicopter coordinate system is as follows:

$$\begin{cases} x_C = L_2\sin\varphi - \dfrac{W}{2} \\ y_C = L_2(1 + \cos\varphi) \end{cases} \quad (5)$$

Wherein $x_C$, $y_C$ respectively represent an $x_0$ direction coordinate and a $y_0$ direction coordinate of the second wheel 3.8 in the helicopter coordinate system.

S32. as shown in FIG. 4, creating a deck coordinate system 4.1 which takes a starting point of a deck towing track 4.9 of the ship as a coordinate origin, a central axis of a starting portion of the towing track 4.9 as a y axis, a direction pointing to the bow 4.10 as a y axis positive direction, a ray perpendicular to the y axis as an x axis, and a direction pointing to a starboard side of the ship as an x axis positive direction, and creating a mathematical equation of the towing track 4.9 and a trajectory equation of the towing indication line under the deck coordinate system 4.1.

The towing indication line includes a left towing indication line 4.2 and a right towing indication line 4.3. A symmetrical midline of the left towing indication line 4.2 and the right towing indication line 4.3 is a towing track 4.9, and the mathematical equation of the towing track 4.9 is as follows:

$$\begin{cases} x = 0 & (0 \leq y \leq Y_4) \\ \left(\dfrac{Y_5}{\sin\alpha}\right)^2 = \left(x + \dfrac{Y_5}{\sin\alpha}\right)^2 + (y - Y_4)^2 & (Y_4 < y \leq Y_4 + Y_5) \\ y = -\cot\alpha \, x + \left(Y_4 + Y_5 + Y_5\cot^2\alpha - \dfrac{l\cot\alpha}{\alpha}\right) & (Y_4 + Y_5 < y \leq Y_4 + Y_5 + Y_6) \\ \left(\dfrac{Y_7}{\sin\alpha}\right)^2 = (x - X_2)^2 + (y - Y_4 - Y_5 - Y_6 - Y_7)^2 & (Y_4 + Y_5 + Y_6 < y \leq Y_4 + Y_5 + Y_6 + Y_7) \\ x = -X_3 & (Y_4 + Y_5 + Y_6 + Y_7 < y \leq Y_4 + Y_5 + Y_6 + Y_7 + Y_8) \end{cases} \quad (8)$$

Where $X_2$ represents the x direction coordinate of a center $O_2$ of an arc corresponding to the fourth segment of the towing track 4.9; $X_3$ represents a distance between they axis and the fifth segment of the towing track 4.9; $Y_4, Y_5, Y_6, Y_7, Y_8$ represent lengths in they direction of the first, second, third, fourth, and fifth segments of the towing track 4.9 respectively; l represents an arc length of the second and fourth segments of the towing track 4.9; and a represents a central angle corresponding to the arc of the second and fourth segments of the towing track 4.9.

The trajectory equation of the left towing indication line 4.2 is as follows:

$$\begin{cases} x = -X_1 & (0 \le y \le Y_1) \\ y = -\cot\alpha x + (Y_1 - \cot\alpha X_1) & (Y_1 < y < Y_1 + Y_2) \\ x = -\dfrac{Y_2}{\cot\alpha} - X_1 & (Y_1 + Y_2 \le y \le Y_1 + Y_2 + Y_3) \end{cases} \quad (9)$$

Wherein $X_1$ represents a distance between the left towing indication line 4.2 and the towing track 4.9; $Y_1, Y_2, Y_3$ respectively represent the lengths in they direction of the first, second and third segments of the left towing indication line 4.2.

The trajectory equation of the right towing indication line 4.3 is as follows:

$$\begin{cases} x = X_1 & (0 \le y \le Y_1) \\ y = -\cot\alpha x + (Y_1 + \cot\alpha X_1) & (Y_1 < y < Y_1 + Y_2) \\ x = X_1 - \dfrac{Y_2}{\cot\alpha} & (Y_1 + Y_2 \le y \le Y_1 + Y_2 + Y_3) \end{cases} \quad (10)$$

S33: The position coordinates of the steering wheel 3.1, the first wheel 3.7, and the second wheel 3.8 of the helicopter in the deck coordinate system 4.1 are obtained through coordinate transformation relationship from the helicopter coordinate system to the deck coordinate system 4.1.

S331. The position of the origin of the helicopter coordinate system is constantly changing with the movement of the quick mooring device 3.4. As the quick mooring device 3.4 moves along the towing track 4.9, the position of the quick mooring device 3.4 on the towing track 4.9 may be obtained through the encoder 4.12 installed on a longitudinal towing device 4.11 while the position of the helicopter mooring bar 3.5 relative to the quick mooring device 3.4 may be obtained through the position of the mechanical claw 3.6 relative to the quick mooring device 3.4. To calculate the coordinate transformation relationship from the helicopter coordinate system to the deck coordinate system 4.1, firstly, the coordinates of the origin of the helicopter coordinate system in the deck coordinate system 4.1 (i.e., the coordinates $(x_G, y_G)$ of the helicopter mooring bar 3.5 in the deck coordinate system 4.1) are calculated:

$$\begin{cases} x_G = x_1 \\ y_G = y_1 \end{cases} \quad (y_1 < Y_4 + l) \quad (6)$$

$$\begin{cases} x_G = -\left[\left(\dfrac{\alpha}{l}\tan\dfrac{\alpha}{2} + y_1 - Y_4 - l\right) \times \sin\alpha - \dfrac{x_1}{\cos\alpha}\right] \\ y_G = \left(\dfrac{\alpha}{l}\tan\dfrac{\alpha}{2} + y_1 - Y_4 - l\right) \times \sin\alpha + Y_4 + \dfrac{\alpha}{l}\tan\dfrac{\alpha}{2} \end{cases} \quad (Y_4 + l \le y_1 < Y_4 + l + Y)$$

$$\begin{cases} x_G = -X_2 \\ y_G = (y_1 - 2l - Y) + Y_5 + Y_6 + Y_7 \end{cases} \quad (Y_4 + l + Y \le y_1 < Y_4 + 2l + Y + Y_8)$$

Wherein $y_1$ represents a movement position of the quick mooring device 3.4 along the towing track 4.9, obtained by the encoder 4.12 installed on a towing power device, Y represents a length of the third segment of the towing track 4.6.

S332: calculating the position coordinates $(x'_A, y'_A)$ of the helicopter steering wheel 3.1 in the deck coordinate system 4.1, the position coordinates $(x'_B, y'_B)$ of the first wheel 3.7 in the deck coordinate system 4.1 and the position coordinates $(x'_C, y'_C)$ of the second wheel 3.8 in the deck coordinate system 4.1, as presented as follows:

$$\begin{cases} x'_A = (L_5 + L_4)\sin\varphi - x_G \\ y'_A = (L_5 + L_4)(1 - \cos\varphi) + y_G \end{cases} \quad (7)$$

$$\begin{cases} x'_B = L_2\sin\varphi + \dfrac{W}{2} - x_G \\ y'_B = L_2\cos\varphi + y_G \end{cases}$$

$$\begin{cases} x'_C = L_2\sin\varphi - \dfrac{W}{2} - x_G \\ y'_C = L_2(1 + \cos\varphi) + y_G \end{cases}.$$

S4. determining boundaries of the steering wheel 3.1, the first wheel 3.7, and the second wheel 3.8 of the helicopter relative to the towing indication line; determining boundaries of the position coordinates of the helicopter steering wheel 3.1, the first wheel 3.7 and the second wheel 3.8 in the deck coordinate system 4.1 relative to the mathematical equation of the towing track 4.9 and the trajectory equation of the towing reference line; according to a distance from a point to a line, obtaining corresponding relationship between the position coordinates of the helicopter steering wheel 3.1, the first wheel 3.7 and the second wheel 3.8 and the trajectory equation of the corresponding towing indication line. The corresponding relationship includes three situations: inside, above and outside the towing indication line, to ensure that the helicopter 3.9 is within the towing indication line during the movement, so as to provide a basis for the selection of a movement route of the helicopter mooring bar 3.5.

S5. Extracting the optimal movement path suitable for the helicopter 3.9: according to the boundary determination of the steering wheel 3.1, the first wheel 3.7, and the second wheel 3.8 of the helicopter, and the deflection angle of the helicopter steering wheel 3.1, the optimal movement path suitable for the helicopter 3.9 at the current attitude is retrieved from a knowledge base that consists of a large amount of manual operational practices and is compiled into executing statements for the DSP control unit 5.1 by using C language.

S6. Driving the movement of the helicopter 3.9 in accordance with the extracted optimal movement path suitable for the helicopter and by calculating lateral and longitudinal movement position control commands; after the selection of the optimal movement path within a control period, the MCU control unit 5.2 sends a lateral alignment position control command to a hydraulic drive system of the quick mooring device 3.4 and a longitudinal towing position control command to a hydraulic drive system of the longitudinal towing device 4.11. The helicopter 3.9 is then driven to move by the quick mooring device 3.4 and the longitudinal towing device 4.11.

S7. Repeating steps S1 to S6 until the automated towing, alignment and the hangar of the helicopter 3.9 are completed: during actual movement of the helicopter 3.9, based on the latest attitude of the helicopter 3.9 from the previous control cycle, the optimal movement path is compensated and adjusted to ensure that the helicopter 3.9 moves towards the hangar according to the extracted optimal movement path.

Figure 6:
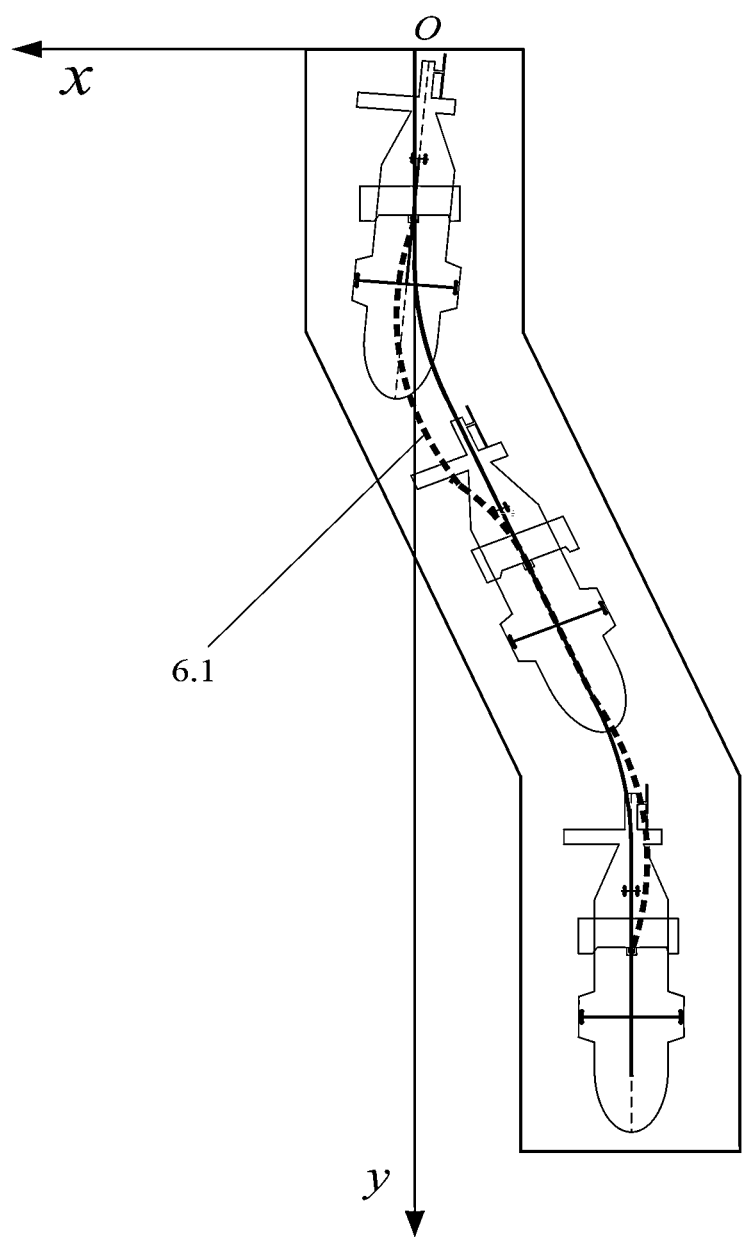
FIG. 6 is a schematic view of transportation process of the helicopter according to the present disclosure.

According to the present disclosure, a comprehensive knowledge base has been established based on numerous practical operations. Specifically, a suitable movement trajectory is selected based on the current position of the helicopter 3.9 on the deck, the yaw angle, and the deflection angle of the steering wheel, the lateral alignment and longitudinal towing position control commands are generated to control the direction of the movement of the helicopter 3.9. As shown in FIG. 5, based on the lateral and longitudinal control commands, the MCU control unit 5.2 of the quick mooring device 3.4 controls the hydraulic system of the quick mooring device 3.4 and the hydraulic system of the longitudinal towing device 4.11, and then drives the movement of the helicopter 3.9, to complete a cycle within a control period. It is determined whether the helicopter 3.9 is towed into the hangar, and if not, the steps of capturing and processing the images of the helicopter steering wheel 3.1, calculating the position of the wheels of the helicopter 3.9, determining the boundaries of the helicopter 3.9, and selecting the movement path, are repeated until the helicopter 3.9 is automatically aligned and towed into the hangar. The schematic view of the transportation process of the helicopter 3.9 is shown in FIG. 6, where the movement trajectory of the helicopter mooring bar 3.5 refers to the movement trajectory 6.1 of the helicopter mooring bar during the process of the automated towing and alignment.

As above described, the present disclosure proposes a fully automated towing, alignment and hangar system and method for an offshore operation helicopter. Based on the quick recovery system of the conventional helicopter, a wide-angle camera is added only to the quick mooring device to capture the image of the steering wheel of the helicopter. According to the images, the yaw angle and the deflection angle of the steering wheel of the helicopter are calculated. The helicopter coordinate system and deck coordinate system are established, and through the coordinate transformation relationship, the positions of the helicopter wheels in the deck coordinate system are computed. Then, based on the boundary determination of the towing indication line equation, the optimal path suitable for the current attitude of the helicopter is extracted from an operational knowledge base. Real-time compensation control is performed on the towing and alignment process within an adjustable control step length. The above steps are repeated continuously until the helicopter is automatically towed and aligned into the hangar. The proposed method does not require human intervention during implementation, greatly reducing the difficulty of transferring the offshore operation helicopters and improving the efficiency of helicopter transfer operations, and therefore, the safety of deck assistance personnel and helicopters can be ensured. The method has significant features such as intelligence, full automation, high efficiency, and safety. It has important practical value in the fields such as shipping and military industries, particularly in the domain of automated towing of the offshore operation helicopter.

It should be noted that the above embodiments are provided for illustration purposes and do not limit the technical scope of the present disclosure. Although the present disclosure has been described in detail with reference to the above embodiments, those skilled in the art would understand that modifications or equivalent substitutions can still be made to the present disclosure without departing from spirit and scope of the disclosure. Any such modifications or partial substitutions should be included within the claims of the present disclosure.

What is claimed is:

1. A method of operating a fully automated towing, alignment and hangar system suitable for an offshore operation helicopter, comprising following steps:

S1. acquiring an attitude image of a steering wheel of a helicopter, wherein as a helicopter transfer system enters an automatic control mode, the attitude image of the current steering wheel of the helicopter is acquired by a wide-angle camera;

S2. calculating a helicopter yaw angle and a steering wheel deflection angle, wherein a DSP control unit processes the acquired attitude image of the steering wheel of the helicopter, extracts characteristic information, and calculates the helicopter yaw angle and the steering wheel deflection angle of the helicopter; the characteristic information includes a contour pixel matrix of a circle, a tire and a rotating shaft of the helicopter steering wheel, and the steering wheel deflection angle are directly obtained through characteristics of the contour pixel matrix;

S3. calculating a position coordinate of the steering wheel of the helicopter, a first wheel and a second wheel in a deck coordinate system, wherein a helicopter coordinate system and the deck coordinate system are created, and the position coordinate of the steering wheel of the helicopter, the first wheel and the second wheel in the deck coordinate system are calculated through a coordinate transformation relationship and the helicopter yaw angle;

S31. creating the helicopter coordinate system, wherein the position coordinate of the steering wheel of the helicopter, the first wheel and the second wheel in the helicopter coordinate system are calculated according to size parameters of the helicopter and the helicopter yaw angle; the helicopter coordinate system takes a helicopter mooring bar as an origin, and when the helicopter yaw angle is 0°, a central axis of the helicopter is a $y_0$ axis, a direction pointing to a bow is a positive direction of the $y_0$ axis, a ray perpendicular to the $y_0$ axis is an $x_0$ axis, and a direction pointing to a starboard side of a ship is a positive direction of the $x_0$ axis;

S32. creating a deck coordinate system, wherein the deck coordinate system takes a starting point of a deck towing track of the ship as a coordinate origin, a central axis of a starting part of the deck towing track as a y axis, a direction pointing to a bow of a ship as a positive direction of they axis, a ray perpendicular to they axis as an x axis, and a direction pointing to a starboard side of the ship as a positive direction of the x axis, and a mathematical equation of the deck towing track and a trajectory equation of a towing indication line are created under the deck coordinate system;

S33. obtaining the position coordinate of the steering wheel of the helicopter, the first wheel and the second wheel in the deck coordinate system by calculating the coordinate transformation relationship from the helicopter coordinate system to the deck coordinate system;

S4. judging boundaries of the steering wheel, the first wheel and the second wheel relative to the towing indication line, wherein the position boundaries of the steering wheel, the first wheel and the second wheel in the deck coordinate system are judged relative to the mathematical equation of the deck towing track and the trajectory equation of the towing indication line; corresponding relationship between the position coordinates of the steering wheel, the first wheel and the second wheel and the trajectory equation of the towing indication line is obtained by calculating a distance from a point to a line, and the corresponding relationship includes three scenarios, that is, inside, above and outside the towing indication line;

S5. extracting an optimal movement path suitable for the helicopter, wherein the optimal movement path suitable for the helicopter at a current attitude is extracted from a knowledge base according to boundary judgment results of the steering wheel, the first wheel and the second wheel and the steering wheel deflection angle; and the knowledge base consists of a large number of manual operation practices, and is compiled into an execution statement of the DSP control unit through C language;

S6. calculating lateral and longitudinal movement position control commands according to the extracted optimal movement path suitable for the helicopter and driving the movement of the helicopter, wherein after selecting the optimal movement path within a control period, the MCU control unit sends a lateral alignment position control command to a hydraulic drive system of a quick mooring device and a longitudinal towing position control command to a hydraulic drive system of a longitudinal towing device, and the quick mooring device and the longitudinal towing device drive the movement of the helicopter;

S7. repeating steps S1 to S6 until the automated towing, alignment and hangar of the helicopter is completed, wherein during an actual movement of the helicopter, the optimal movement path is compensated and adjusted according to a latest attitude of the helicopter within the control period, so as to ensure that the helicopter moves towards a hangar according to the extracted optimal movement path.

2. The method of operating the fully automated towing, alignment and hangar system suitable for the offshore operation helicopter according to claim 1, wherein the step S2 specifically comprises following steps:

S21. calculating the deflection angle $\theta$ of a body of the helicopter relative to a central axis of the wide-angle camera based on a position of the contour pixel matrix of the steering wheel in a whole image;

S22. acquiring a vertical offset distance h of the helicopter steering wheel in a longitudinal direction based on the contour pixel matrix of the steering wheel;

$$h = L_4\left(1 - \frac{m_2 \times n_2}{m_1 \times n_1}L_4\right) \quad (1)$$

Wherein $L_4$ represents a vertical distance between a rear wall of the quick mooring device and a central axis of the steering wheel when the helicopter yaw angle is 0°; $m_1$, $n_1$ respectively represent horizontal and vertical pixel numbers of the contour pixel matrix occupied by the steering wheel in an attitude image when the helicopter yaw angle is 0°; $m_2, n_2$ respectively represent the horizontal and vertical pixel numbers of the contour pixel matrix occupied by the steering wheel in the attitude image when the helicopter is in a yaw state;

S23. calculating the helicopter yaw angle $\varphi$:

$$\phi = \arcsin\left(\frac{\tan\theta(L_4 - h) - x_1}{L_3}\right) \quad (2)$$

wherein $x_1$ represents a position indicating deviation of an origin of the helicopter coordinate system relative to a center of the quick mooring device, which is obtained by a position signal of a mechanical claw of the quick mooring device; and $L_3$ represents a vertical distance between the central axis of the steering wheel and the helicopter mooring bar.

3. The method of operating fully automated towing, alignment and hangar system suitable for the an offshore operation helicopter according to claim 1, wherein in the step S31, the position coordinates of the steering wheel in the helicopter coordinate system are as follows:

$$\begin{cases} x_A = (L_4 + L_5)\sin\varphi \\ y_A = (L_4 + L_5)(1 - \cos\varphi) \end{cases} \quad (3)$$

wherein $x_A$, $y_A$ respectively represent an $x_0$ direction coordinate and a $y_0$ direction coordinate of the steering wheel in the helicopter coordinate system; and $L_5$ represents a distance between the rear wall of the quick mooring device and the center of the helicopter mooring bar;

a position coordinate of the first wheel in the helicopter coordinate system is as follows:

$$\begin{cases} x_B = L_2\sin\varphi + \dfrac{W}{2} \\ y_B = L_2\cos\varphi \end{cases} \quad (4)$$

wherein $x_B$, $y_B$ respectively represent an $x_0$ direction coordinate and a $y_0$ direction coordinate of the first wheel in the helicopter coordinate system; $L_2$ represents a vertical distance from the helicopter mooring bar to a wheel shaft of the helicopter steering wheel, which is a central axis of the first wheel and the second wheel; W represents a wheel pitch of the first wheel and the second wheel;

a position coordinates of the second wheel in the helicopter coordinate system is as follows:

$$\begin{cases} x_C = L_2\sin\varphi - \dfrac{W}{2} \\ y_C = L_2(1 + \cos\varphi) \end{cases} \quad (5)$$

wherein $x_C$, $y_C$ representatively represent an $x_0$ direction coordinate and a $y_0$ direction coordinate of the second wheel in the helicopter coordinate system.

4. The method of operating the fully automated towing, alignment and hangar system suitable for an offshore operation helicopter according to claim 1, wherein the step S33 specifically comprises following steps:

S331. calculating the coordinate transformation relationship from the helicopter coordinate system to the deck coordinate system, wherein the coordinates of the origin of the helicopter coordinate system in the deck coordinate system are first calculated, that is, the coordinates $(x_G, y_G)$ of the helicopter mooring bar in the deck coordinate system are as follows:

$$\begin{cases} x_G = x_1 \\ y_G = y_1 \end{cases} \quad (y_1 < Y_4 + l) \quad (6)$$

$$\begin{cases} x_G = -\left[\left(\frac{\alpha}{l}\tan\frac{\alpha}{2} + y_1 - Y_4 - l\right) \times \sin\alpha - \frac{x_1}{\cos\alpha}\right] \\ y_G = \left(\frac{\alpha}{l}\tan\frac{\alpha}{2} + y_1 - Y_4 - l\right) \times \sin\alpha + Y_4 + \frac{\alpha}{l}\tan\frac{\alpha}{2} \end{cases} \quad (Y_4 + l \le y_1 < Y_4 + l + Y)$$

$$\begin{cases} x_G = -X_2 \\ y_G = (y_1 - 2l - Y) + Y_5 + Y_6 + Y_7 \end{cases} \quad (Y_4 + l + Y \le y_1 < Y_4 + 2l + Y + Y_8)$$

wherein $y_1$ represents a movement position of the quick mooring device along the deck towing track, obtained by an encoder installed on a towing power device; $Y_4, Y_5, Y_6, Y_7, Y_8$ respectively represent lengths of a first segment of the deck towing track, a second segment of the deck towing track, a third segment of the deck towing track, a fourth segment of the deck towing track and a fifth segment of the deck towing track in ay direction; Y represents a length of the third segment of the deck towing track; l represents an arc length of the second segment of the deck towing track and the fourth segment of the deck towing track; $X_2$ represents an x direction coordinate of a circle center $O_2$ corresponding to an arc of the fourth segment of the deck towing track; a represents a circle center angle corresponding to the arcs of the second segment of the deck towing track and the fourth segment of the deck towing track;

S332. calculating position coordinates $(x'_A, y'_A)$ of the steering wheel in the deck coordinate system, a position coordinate $(x'_B, y'_B)$ of the first wheel in the deck coordinate system and a position coordinate $(x'_C, y'_C)$ of the second wheel in the deck coordinate system, which are respectively presented as follows:

$$\begin{cases} x'_A = (L_5 + L_4)\sin\varphi - x_G \\ y'_A = (L_5 + L_4)(1 - \cos\varphi) + y_G \end{cases} \quad (7)$$

$$\begin{cases} x'_B = L_2\sin\varphi + \frac{W}{2} - x_G \\ y'_B = L_2\cos\varphi + y_G \end{cases}$$

$$\begin{cases} x'_C = L_2\sin\varphi - \frac{W}{2} - x_G \\ y'_C = L_2(1 + \cos\varphi) + y_G \end{cases}.$$

5. The method of operating the fully automated towing, alignment and hangar system suitable for the offshore operation helicopter according to claim 1, wherein in the step S32, the towing indication line comprises a left towing indication line and a right towing indication line, a symmetrical median line of the left towing indication line and the right towing indication line refers to the deck towing track, and a mathematical equation of the deck towing track is as follows:

$$\begin{cases} x = 0 & (0 \le y \le Y_4) \\ \left(\frac{Y_5}{\sin\alpha}\right)^2 = \left(x + \frac{Y_5}{\sin\alpha}\right)^2 + (y - Y_4)^2 & (Y_4 < y \le Y_4 + Y_5) \\ y = -\cot\alpha x + \left(Y_4 + Y_5 + Y_5\cot^2\alpha - \frac{l\cot\alpha}{\alpha}\right) & (Y_4 + Y_5 < y \le Y_4 + Y_5 + Y_6) \\ \left(\frac{Y_7}{\sin\alpha}\right)^2 = (x - X_2)^2 + (y - Y_4 - Y_5 - Y_6 - Y_7)^2 & (Y_4 + Y_5 + Y_6 < y \le Y_4 + Y_5 + Y_6 + Y_7) \\ x = -X_3 & (Y_4 + Y_5 + Y_6 + Y_7 < y \le Y_4 + Y_5 + Y_6 + Y_7 + Y_8) \end{cases} \quad (8)$$

where $X_3$ represents a distance between they axis and the fifth segment of the deck towing track;

the trajectory equation of the left towing indication line is as follows:

$$\begin{cases} x = -X_1 & (0 \le y \le Y_1) \\ y = -\cot\alpha x + (Y_1 - \cot\alpha X_1) & (Y_1 < y < Y_1 + Y_2) \\ x = -\frac{Y_2}{\cot\alpha} - X_1 & (Y_1 + Y_2 \le y \le Y_1 + Y_2 + Y_3) \end{cases} \quad (9)$$

Wherein $X_1$ represents a distance between the left towing indication line and the deck towing track; $Y_1, Y_2, Y_3$ respectively represent the lengths of a first segment of the left towing indication line, a second segment of the left towing indication line and a third segment of the left towing indication line in they direction;

the trajectory equation of the right towing indication line is as follows:

$$\begin{cases} x = X_1 & (0 \le y \le Y_1) \\ y = -\cot\alpha x + (Y_1 + \cot\alpha X_1) & (Y_1 < y < Y_1 + Y_2) \\ x = X_1 - \frac{Y_2}{\cot\alpha} & (Y_1 + Y_2 \le y \le Y_1 + Y_2 + Y_3) \end{cases} \quad (10)$$

6. The method of operating the fully automated towing, alignment and hangar system suitable for the offshore operation helicopter according to claim 1, wherein when the helicopter yaw angle fuselage is 0°, the wide-angle camera coincides with an axis of the body of the helicopter, and the wide-angle camera acquires an image state of the steering wheel within ±37.5° with the deck towing track as a center line.

7. A fully automated towing, alignment and hangar system using the method of operating the fully automated towing, alignment and hangar system suitable for the offshore operation helicopter according to claim 1, wherein the fully automated towing, alignment and hangar system comprises a quick mooring device for a lateral alignment for a movement of the helicopter, a wide-angle camera for acquiring attitudes of steering wheel, a longitudinal towing device for longitudinally towing the movement of the helicopter, a control system and the helicopter, and a helicopter mooring bar, and the fully automated towing, alignment and hangar system has following characteristics:

- the quick mooring device is equipped with a mechanical claw that is connected to the helicopter mooring bar installed on a belly of the helicopter via a cylindrical joint, during a process that the quick mooring device laterally aligns the movement of the helicopter, the mechanical claw remains perpendicular to the deck towing track and follows the movement of the helicopter;
- the wide-angle camera is installed at a central position of the rear wall of the quick mooring device and moves along with the quick mooring device, during a process that the quick mooring device and the longitudinal towing device tow the movement of the helicopter, the wide-angel camera always captures the attitudes of the steering wheel;
- during the process that the longitudinal towing device tows the movement of the helicopter, the quick mooring device always moves along with the movement of the helicopter along the deck towing track, and the longitudinal towing device comprises an encoder for recording a position of the quick mooring device on the deck towing track, and the deck towing track is divided into five segments including a first segment of the deck towing track, a second segment of the deck towing track, a third segment of the deck towing track, a fourth segment of the deck towing track and a fifth segment of the towing track;
- the control system comprises a DSP control unit and an MCU control unit, wherein the DSP control unit is configured to process attitude images of the steering wheel, creates a helicopter coordinate system and a deck coordinate system, calculates a wheel position coordinate, judges a boundary of a towing indication line, stores and extracts a movement path of the helicopter; and the MCU control unit is configured to generate horizontal and vertical position control commands;
- the helicopter comprises a steering wheel, a first wheel and a second wheel, wherein the steering wheel is installed at a tail of the helicopter and is a universal wheel with large eccentricity.

\* \* \* \* \*